(12) United States Patent
Zenitani et al.

(10) Patent No.: US 11,148,951 B2
(45) Date of Patent: *Oct. 19, 2021

(54) SILICA-TITANIA COMPOSITE AND STRUCTURE

(71) Applicant: FUJIFILM BUSINESS INNOVATION CORP., Tokyo (JP)

(72) Inventors: Yuka Zenitani, Kanagawa (JP); Hiroyoshi Okuno, Kanagawa (JP); Hideaki Yoshikawa, Kanagawa (JP); Takeshi Iwanaga, Kanagawa (JP); Shunsuke Nozaki, Kanagawa (JP); Sakae Takeuchi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 274 days.

This patent is subject to a terminal disclaimer.

(21) Appl. No.: 16/358,138

(22) Filed: Mar. 19, 2019

(65) Prior Publication Data

US 2020/0039830 A1  Feb. 6, 2020

(30) Foreign Application Priority Data

Aug. 3, 2018 (JP) .............................. JP2018-147133

(51) Int. Cl.
*C01B 33/18* (2006.01)
(52) U.S. Cl.
CPC .......... *C01B 33/18* (2013.01); *C01P 2006/12* (2013.01); *C01P 2006/90* (2013.01)

(58) Field of Classification Search
CPC ... C01B 33/18; C01P 2006/12; C01P 2006/90
(Continued)

(56) References Cited

U.S. PATENT DOCUMENTS 10,807,058 B2 * 10/2020 Kadokura ............ C01G 23/047
10,807,070 B2 * 10/2020 Kashima ............. B01J 35/1019

FOREIGN PATENT DOCUMENTS

JP          H10-88452 A      4/1998
JP          2004-353097 A    12/2004
(Continued)

OTHER PUBLICATIONS

Zhu et al ("Synthesis and characterization of superhydrophobic silica and silica/titania aerogels by sol-gel method at ambient pressure", Colloids and Surfaces A: Physicochem. Eng. Aspects 342 (2009) 97-101). (Year: 2009).*

(Continued)

*Primary Examiner* — Sheng H Davis
*Assistant Examiner* — Michael Forrest
(74) *Attorney, Agent, or Firm* — Oliff PLC

(57) ABSTRACT

A silica-titania composite has a BET specific surface area, as determined by BET analysis of a water vapor adsorption isotherm, in the range of 250 m$^2$/g to 500 m$^2$/g and a contact angle with water of 100° or greater. In the water vapor adsorption isotherm, an adsorbed amount at relative pressure $P/P_0$=0.1 is in a range of 65 cm$^3$/g to 120 cm$^3$/g, an adsorbed amount at relative pressure $P/P_0$=0.5 is in a range of 150 cm$^3$/g to 300 cm$^3$/g, and an adsorbed amount at relative pressure $P/P_0$=0.9 is in a range of 350 cm$^3$/g to 500 cm$^3$/g.

17 Claims, 1 Drawing Sheet

(58) Field of Classification Search
USPC .......................................................... 502/407
See application file for complete search history.

(56) References Cited

FOREIGN PATENT DOCUMENTS

| | | |
|---|---|---|
| JP | 2016-515169 A | 5/2016 |
| WO | 2014/168370 A1 | 10/2014 |

OTHER PUBLICATIONS

Aravind et al ("Silica-titania aerogel monoliths with large pore volume and surface area by ambient pressure drying", J Sol-Gel Sci Technol (2009) 52:328-334.) (Year: 2009).*

Fang et al ("Synthesis of highly hydrophobic rutile titania-silica nanocomposites by an improved hydrolysis co-precipitation method," Ceram. Int. 43 (2017) 5592-5598) (Year: 2017).*

* cited by examiner

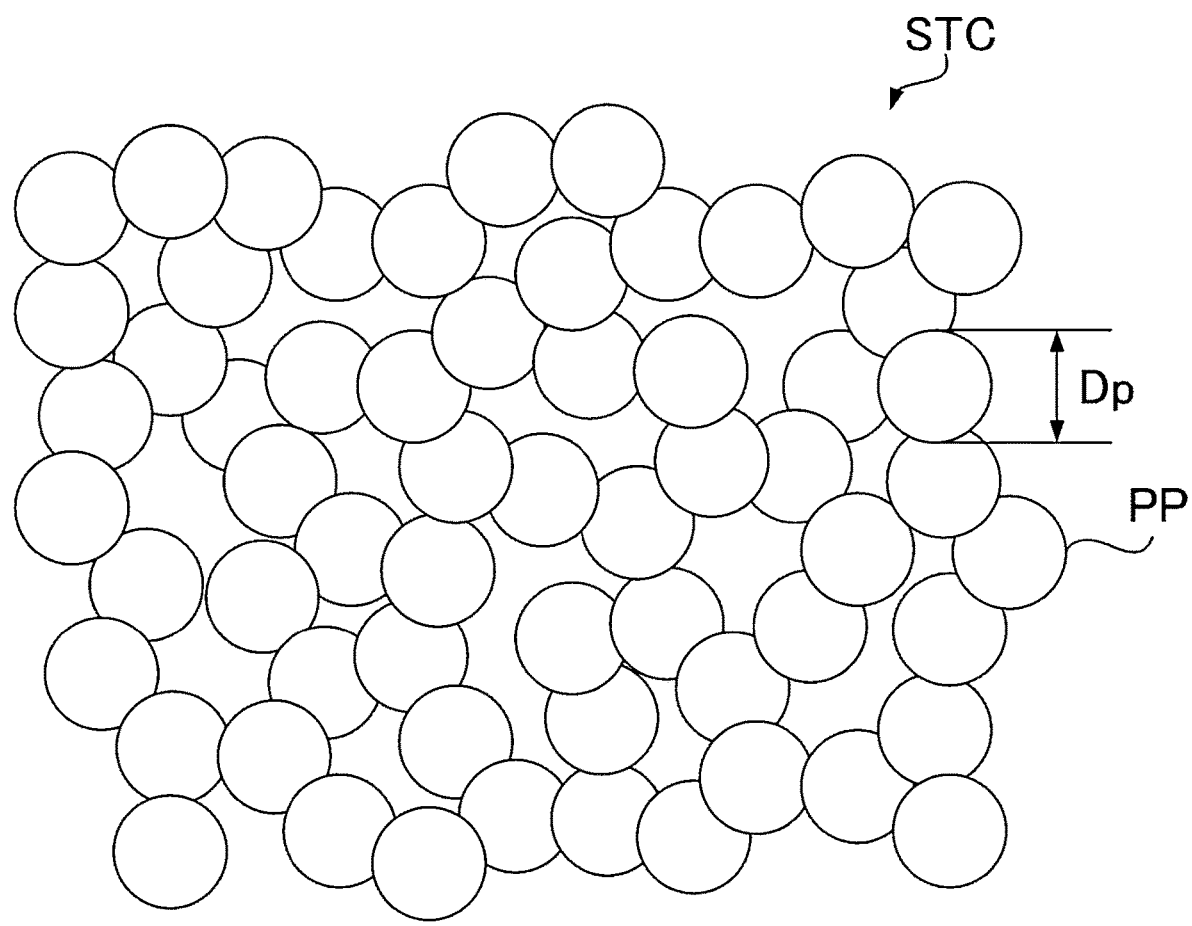

SILICA-TITANIA COMPOSITE AND STRUCTURE

CROSS-REFERENCE TO RELATED APPLICATIONS

This application is based on and claims priority under 35 USC 119 from Japanese Patent Application No. 2018-147133 filed Aug. 3, 2018.

BACKGROUND

(i) Technical Field

The present disclosure relates to a silica-titania composite and a structure.

(ii) Related Art

Adsorbent materials, which have a capacity to adsorb substances (e.g., hydrophiles such as moisture and ammonia), can be found in various applications such as clothing and accessories, construction materials, and wall materials.

For example, Japanese Laid Open Patent Application Publication No. 10-88452 discloses "a nonwoven fabric material that is highly water-absorbent and has a capacity to adsorb ammonia to reduce ammoniacal odors".

Japanese Laid Open Patent Application Publication No. 2004-353097 discloses "a waterproof fabric that is made of a water-repellent treated fabric including a composite yarn composed of a hygroscopic material and a nonhygroscopic material".

Japanese Translation of PCT International Application Publication No. JP-T-2016-515169 discloses "a nonwoven fabric material that is made of a fluoropolymer-coated nonwoven fabric including a hygroscopic fabric and thus has both hygroscopicity and water-repellency".

SUMMARY

However, an adsorbent material with a high capacity to adsorb substances (e.g., hydrophiles such as moisture and ammonia) is likely to also adsorb dirt, dust, etc. Furthermore, when water or other liquid comes into direct contact with such an adsorbent material, it tends to permeate the adsorbent material. As a result of this, the adsorbent material may be, for example, discolored or blotted to become stained.

Coating a surface of such an adsorbent material with a water-repellent material in order to prevent the occurrence of a stain may reduce the adsorption capacity of the adsorbent material.

Aspects of non-limiting embodiments of the present disclosure relate to a silica-titania composite having a BET specific surface area, as determined by BET analysis of a water vapor adsorption isotherm, of 250 m²/g or more and 500 m²/g or less. The silica-titania composite has higher stain resistance and higher hydrophile adsorptivity than a silica-titania composite having a water vapor adsorption isotherm in which an adsorbed amount at relative pressure $P/P_0$=0.1 is less than 65 cm³/g or having a contact angle with water of less than 100° or than a silica-titania composite having an ammonia adsorption isotherm in which an adsorbed amount at an ammonia pressure of 10 kPa is less than 100 cm³/g or having a contact angle with water of 100° or greater.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a silica-titania composite having a BET specific surface area, as determined by BET analysis of a water vapor adsorption isotherm, in a range of 250 m²/g to 500 m²/g, and a contact angle with water of 100° or greater.

In the water vapor adsorption isotherm, an adsorbed amount at relative pressure $P/P_0$=0.1 is in a range of 65 cm³/g to 120 cm³/g, an adsorbed amount at relative pressure $P/P_0$=0.5 is in a range of 150 cm³/g to 300 cm³/g, and an adsorbed amount at relative pressure $P/P_0$=0.9 is in a range of 350 cm³/g to 500 cm³/g.

BRIEF DESCRIPTION OF THE DRAWING

Exemplary embodiments of the present disclosure will be described in detail based on the following FIGURE, wherein:

FIGURE is a schematic view of an exemplary silica-titania composite according to the exemplary embodiment.

DETAILED DESCRIPTION

Exemplary embodiments of the present disclosure will hereinafter be described.

In this specification, if there are two or more substances corresponding to one component in a composition, the amount of the component in the composition refers to the total amount of the two or more substances in the composition, unless otherwise specified.

The term "step" encompasses not only a separate step but also a step that is not clearly distinguished from another step if the desired object of the step is achieved.

XPS is the abbreviation for X-ray photoelectron spectroscopy.

In a relative pressure $P/P_0$ in adsorption-desorption isotherms, "P" represents the pressure of an adsorbate gas (water vapor or nitrogen) in adsorption equilibrium, and "$P_0$" represents the saturated vapor pressure of the adsorbate at an adsorption temperature.

Silica-Titania Composite

A silica-titania composite according to an exemplary embodiment has a BET specific surface area, as determined by BET analysis of a water vapor adsorption isotherm, of 250 m²/g or more and 500 m²/g or less, satisfies at least one of the following $H_2O$ adsorption properties (1) and $NH_3$ adsorption properties (2), and has a contact angle with water of 100° or greater.

$H_2O$ adsorption properties (1): In a water vapor adsorption isotherm, an adsorbed amount at relative pressure $P/P_0$=0.1 is 65 cm³/g or more and 120 cm³/g or less, an adsorbed amount at relative pressure $P/P_0$=0.5 is 150 cm³/g or more and 300 cm³/g or less, and an adsorbed amount at relative pressure $P/P_0$=0.9 is 350 cm³/g or more and 500 cm³/g or less.

$NH_3$ adsorption properties (2): In an ammonia adsorption isotherm, an adsorbed amount at an ammonia pressure of 10 kPa is 100 cm³/g or more and 140 cm³/g or less, and an adsorbed amount at an ammonia pressure of 90 kPa is 120 cm³/g or more and 300 cm³/g or less.

The silica-titania composite according to the exemplary embodiment has, in addition to a hydrophile adsorption capacity improved by combination of titania with silica, a large BET specific surface area of 250 m²/g or more and 500 m²/g or less, and a high water vapor adsorption capacity at relative pressure $P/P_0=0.1$ (i.e., on the micropore side) and a high ammonia adsorption capacity at an ammonia pressure of 10 kPa (i.e., on the micropore side). On the other hand, the silica-titania composite has high water-repellency such that the contact angle between the composite itself and water is 100° or greater.

The silica-titania composite having these properties, while having high water-repellency, has a high adsorption capacity probably because "TiOH" and "SiOH" coexist on the surface.

Thus, the silica-titania composite according to the exemplary embodiment has high hydrophile adsorptivity as well as high stain resistance.

The silica-titania composite according to the exemplary embodiment will now be described in detail.

The silica-titania composite according to the exemplary embodiment has an aerogel structure, for example. The term "aerogel structure" refers to a structure in which primary particles are aggregated while forming a porous structure. The "aerogel structure" is a cluster structure formed of gathered particulate substances having diameters on the order of nanometers, and the internal structure of the "aerogel structure" is a three-dimensional network microstructure.

FIGURE schematically illustrates an exemplary structure of the silica-titania composite according to the exemplary embodiment. The silica-titania composite illustrated in FIGURE is an aggregate in which primary particles are aggregated while forming a porous structure. In FIGURE, STC denotes a silica-titania composite, PP denotes a primary particle, and Dp denotes a primary particle diameter.

The average diameter of primary particles (average primary particle diameter) of the silica-titania composite is preferably 1 nm or more and 90 nm or less, more preferably 5 nm or more and 80 nm or less, still more preferably 10 nm or more and 70 nm or less.

When the average diameter of primary particles is in the above range, the primary particles are readily aggregated while forming a porous structure. This increases the BET specific surface area of the composite, leading to an increased adsorption capacity. Also, structural water-repellency due to the aerogel structure is readily provided. As a result, the composite tends to have improved stain resistance and improved hydrophile adsorptivity.

The average diameter of primary particles of the silica-titania composite is measured by the following method.

A sample is taken from a target composite. The sample is observed under a scanning electron microscope (S-4100 manufactured by Hitachi, Ltd.), and an image is captured. When the image is captured, the scanning electron microscope is adjusted to a magnification that allows image analysis of primary particles, which are particles forming an aggregate as schematically illustrated in FIGURE. The image is imported into an image analyzer (LUZEX III manufactured by NIRECO CORPORATION), and areas of the primary particles are determined by image analysis of the particles. Equivalent circle diameters (nm) are calculated from the areas, and the equivalent circle diameters are averaged to determine the average primary particle diameter (nm). The average primary particle diameter is determined by analyzing about 10 to 50 primary particles.

The silica-titania composite according to the exemplary embodiment has a BET specific surface area, as determined by BET analysis of a water vapor adsorption isotherm, of 250 m²/g or more and 500 m²/g or less, but for improved stain resistance and improved hydrophile adsorptivity, the BET specific surface area is preferably 300 m²/g or more and 480 m²/g or less, more preferably 350 m²/g or more and 450 m²/g or less.

The silica-titania composite according to the exemplary embodiment satisfies at least one of the above-described $H_2O$ adsorption properties (1) and the above-described $NH_3$ adsorption properties (2).

For the $H_2O$ adsorption properties (1), the adsorbed amount at relative pressure $P/P_0=0.1$ is 65 cm³/g or more and 120 cm³/g or less, but for improved hydrophile adsorptivity, it is preferably 80 cm³/g or more and 120 cm³/g or less, more preferably 90 cm³/g or more and 120 cm³/g or less.

The adsorbed amount at relative pressure $P/P_0=0.5$ is 150 cm³/g or more and 300 cm³/g or less, but for improved hydrophile adsorptivity, it is preferably 180 cm³/g or more and 270 cm³/g or less, more preferably 200 cm³/g or more and 250 cm³/g or less.

The adsorbed amount at relative pressure $P/P_0=0.9$ is 350 cm³/g or more and 500 cm³/g or less, but for improved hydrophile adsorptivity, it is preferably 370 cm³/g or more and 480 cm³/g or less, more preferably 400 cm³/g or more and 450 cm³/g or less.

For the $H_2O$ adsorption properties (1), a water vapor desorption isotherm, together with the water vapor adsorption isotherm, may form a hysteresis loop. To reduce the likelihood that hydrophiles adsorbed are released, the relative pressure $P_c/P_0$ at which the hysteresis loop is closed is preferably 0 or more and 0.3 or less, more preferably 0 or more and 0.1 or less.

For the $NH_3$ adsorption properties (2), the adsorbed amount at an ammonia pressure of 10 kPa is 100 cm³/g or more and 140 cm³/g or less, but for improved hydrophile adsorptivity, it is preferably 110 cm³/g or more and 140 cm³/g or less, more preferably 120 cm³/g or more and 140 cm³/g or less.

The adsorbed amount at an ammonia pressure of 90 kPa is 120 cm³/g or more and 300 cm³/g or less, but for improved hydrophile adsorptivity, it is preferably 150 cm³/g or more and 300 cm³/g or less, more preferably 170 cm³/g or more and 300 cm³/g or less.

For the $NH_3$ adsorption properties (2), an ammonia desorption isotherm, together with the ammonia adsorption isotherm, may form a hysteresis loop. To reduce the likelihood that unpleasant household odors adsorbed are released, the ammonia pressure at which the hysteresis loop is closed is preferably 0 kPa or more and 30 kPa or less, more preferably 0 kPa or more and 10 kPa or less.

Water vapor adsorption-desorption isotherms and ammonia adsorption-desorption isotherms are measured as follows.

A sample of 0.5 g is taken from a target composite. The sample is then vacuum-dried at 120° C. for 20 hours. The dried sample is then placed in a specific surface area meter (trade name: BELSORP-MAX, manufactured by Microtrac-BEL Corp). Using this apparatus and water vapor or ammonia gas ($NH_3$ purity=99.9995%) as an adsorbate, water vapor adsorption-desorption isotherms or ammonia adsorption-desorption isotherms are measured at a measurement temperature of 298 K.

Among the water vapor adsorption-desorption isotherms obtained, the water vapor adsorption isotherm at a relative pressure $P/P_0$ range of 0.05 to 0.30 is subjected to BET analysis (analyzed by a BET multipoint method) to calculate a BET specific surface area.

The adsorbed amount at each relative pressure $P/P_0$ is determined from the water vapor adsorption isotherm, and the adsorbed amount at each ammonia pressure is determined from the ammonia adsorption isotherm.

The relative pressure $P_c/P_0$ at which the hysteresis loop is closed is determined from the water vapor adsorption-desorption isotherms, and the ammonia pressure at which the hysteresis loop is closed is determined from the ammonia adsorption-desorption isotherms.

The relative pressure $P_c/P_0$ at which the hysteresis loop is closed is defined as a relative pressure at which the difference between the desorption isotherm and the adsorption isotherm falls below 0.1 cm³/g. The ammonia pressure at which the hysteresis loop is closed is defined as a pressure at which the difference between the desorption isotherm and the adsorption isotherm falls below 0.1 cm³/g.

For improved stain resistance and improved hydrophile adsorptivity, the "BET specific surface area determined by BET analysis of nitrogen adsorption isotherm" of the silica-titania composite according to the exemplary embodiment is preferably 400 m²/g or more and 1,200 m²/g or less, more preferably 450 m²/g or more and 900 m²/g or less.

The "BET specific surface area determined by BET analysis of nitrogen adsorption isotherm" is measured by the following method.

A sample of 0.5 g is taken from a measuring object. The sample is pretreated at 120° C. for 20 hours for degassing. The sample is then put in a MACSORB HM model-1201 specific surface area meter manufactured by Mountech Co., Ltd. Using this apparatus and nitrogen gas with a purity of 99.99% or more as an adsorbate, nitrogen adsorption-desorption isotherms are measured at a measurement temperature of 77 K. The measurement interval of relative pressure $P/P_0$ is 0.02.

Among the nitrogen adsorption-desorption isotherms obtained, the nitrogen vapor adsorption isotherm at a relative pressure $P/P_0$ range of 0.05 to 0.30 is subjected to BET analysis (analyzed by a BET multipoint method) to calculate a BET specific surface area.

The "contact angle with water" of the silica-titania composite according to the exemplary embodiment is 100° or greater, but for improved stain resistance, it is preferably 120° or greater, more preferably 130° or greater. To achieve both stain resistance and adsorptivity, the upper limit of the "contact angle with water" is preferably 160° or less, more preferably 150° or less.

The "contact angle with water" is measured by the following method.

A part of a target composite is taken and compression molded under a load of 300 kg/cm², whereby a sample having a diameter of 10 mm and a thickness of 2 mm is obtained.

Next, in an environment at a temperature of 25° C. and a humidity of 50%, using a contact angle meter (manufactured by Kyowa Interface Science Co., Ltd., model: CA-X-FACE), 3 µl of pure water is dropped onto a surface, 10 mm in diameter, of the sample, and an image of the droplet at three seconds after being dropped is captured with a light microscope. From the image obtained, a contact angle θ with water is determined by the θ/2 method.

The "elemental ratio of titanium to silicon (Ti/Si)" of the silica-titania composite according to the exemplary embodiment is preferably 1% or more and 50% or less, more preferably 2% or more and 35% or less, still more preferably 3% or more and 20% or less.

When the "elemental ratio of titanium to silicon (Ti/Si)" is in the above range, silica enters a titania skeleton, and thus the particle diameter of the primary particles of the silica-titania composite decreases. This increases the BET specific surface area of the composite, leading to an increased adsorption capacity. Also, structural water-repellency due to the aerogel structure is readily provided. As a result, the composite tends to have improved stain resistance and improved hydrophile adsorptivity.

The "elemental ratio of titanium to silicon (Ti/Si)" is determined by performing an XPS qualitative analysis (wide scan analysis) and creating an elemental profile of the silica-titania composite, specifically, as follows.

Using an XPS analyzer, a qualitative analysis (wide scan analysis) is performed under the following conditions while etching the surface of the silica-titania composite in the depth direction, thereby identifying and quantifying titanium atoms, silicon atoms, and carbon atoms. Using the data obtained, elemental profiles of titanium atoms, silicon atoms, and carbon atoms are drawn with peak intensity plotted on the vertical axis and etching time on the horizontal axis. Each profile curve is divided into multiple regions at inflection points. A region (region A described below) where the peak intensity of titanium atoms and the peak intensity of silicon atoms are substantially constant is determined, and the elemental ratio Si/Ti in the region is determined.

XPS analyzer: VERSA PROBEII manufactured by Ulvac-Phi, Incorporated
X-ray source: monochromatized AlKa radiation
Acceleration voltage: 15 kV
X-ray beam diameter: 100 µm
Etching gun: argon ion beam
Etching power: 4 kV The silica-titania composite according to the exemplary embodiment includes a silica-titania composite which is a composite oxide of silicon and titanium. The total content of silica components and titania components is preferably 80 mass % or more, more preferably 90 mass % or more, still more preferably 95 mass % or more, relative to the total mass of the composite.

The silica-titania composite according to the exemplary embodiment may be formed of a hydrolysis condensate of an alkoxysilane and a titanium alkoxide. However, some hydrocarbon groups, such as alkoxy groups, of the alkoxysilane or the titanium alkoxide may remain unreacted and be left behind in the composite.

The silica-titania composite according to the exemplary embodiment may be a hydrophobized composite. That is, for example, the silica-titania composite may be a composite surface-treated with a hydrophobizing agent.

Specifically, for example, the silica-titania composite may include a coating layer containing an organometallic compound containing a metal atom and a hydrocarbon group.

For improved stain resistance and improved hydrophile adsorptivity, the organometallic compound may be bonded to a composite body through an oxygen atom O directly bonded to a metal atom M in the organometallic compound, that is, may be bonded to the composite body via a covalent bond M-O—Ti or M-O—Si.

That is, the coating layer may be a coating layer containing a metal atom bearing a hydrocarbon group, the metal atom being bonded to the surface of the composite body through an oxygen atom.

The term "composite body" refers to a composite on which the coating layer is to be formed.

If the silica-titania composite according to the exemplary embodiment is surface-treated with a hydrophobizing agent, for example, the hydrocarbon group in the coating layer may exhibit high water-repellency, while a high adsorption capacity may be readily exhibited because "TiOH" and "SiOH" coexist on the surface of the composite body.

For improved stain resistance and improved hydrophile adsorptivity, the organometallic compound constituting the coating layer may be a metal compound containing only metal, carbon, hydrogen, and oxygen atoms.

For improved stain resistance and improved hydrophile adsorptivity, the organometallic compound may contain a metal atom M and a hydrocarbon group directly bonded to the metal atom M. That is, for improved stain resistance and improved hydrophile adsorptivity, a coating layer having a structure in which a hydrocarbon group, a metal atom M, an oxygen atom O, and a titanium atom Ti or a silicon atom Si are linked in this order through covalent bonds (hydrocarbon group-M-O—Ti or hydrocarbon group-M-O—Si) may be present on the surface of the silica-titania composite.

The state of interatomic chemical bonding in the coating layer can be determined by performing an XPS high resolution analysis (narrow scan analysis).

For improved stain resistance and improved hydrophile adsorptivity, the metal atom constituting the organometallic compound is preferably a silicon atom, an aluminum atom, or a titanium atom, more preferably a silicon atom or an aluminum atom, particularly preferably a silicon atom.

Examples of the hydrocarbon group of the organometallic compound include saturated and unsaturated aliphatic hydrocarbon groups having 3 to 40 carbon atoms (preferably 3 to 20 carbon atoms, more preferably 3 to 18 carbon atoms, still more preferably 4 to 12 carbon atoms, particularly preferably 4 to 10 carbon atoms) and aromatic hydrocarbon groups having 6 to 27 carbon atoms (preferably 6 to 20 carbon atoms, more preferably 6 to 18 carbon atoms, still more preferably 6 to 12 carbon atoms, particularly preferably 6 to 10 carbon atoms).

For improved stain resistance and improved hydrophile adsorptivity, the hydrocarbon group of the organometallic compound is preferably an aliphatic hydrocarbon group, more preferably a saturated aliphatic hydrocarbon group, particularly preferably an alkyl group. The aliphatic hydrocarbon group may be linear, branched, or cyclic, and is preferably linear or branched for improved stain resistance and improved hydrophile adsorptivity. The number of carbon atoms in the aliphatic hydrocarbon group is preferably 3 to 20, more preferably 3 to 18, still more preferably 4 to 12, particularly preferably 4 to 10.

Examples of the saturated aliphatic hydrocarbon group of the organometallic compound include linear alkyl groups (e.g., methyl, ethyl, propyl, butyl, pentyl, hexyl, heptyl, octyl, nonyl, decyl, dodecyl, hexadecyl, and icosyl groups), branched alkyl groups (e.g., isopropyl, isobutyl, isopentyl, neopentyl, 2-ethylhexyl, tertiary butyl, tertiary pentyl, and isopentadecyl groups), and cyclic alkyl groups (e.g., cyclopropyl, cyclopentyl, cyclohexyl, cycloheptyl, cyclooctyl, tricyclodecyl, norbornyl, and adamantyl groups).

Examples of the unsaturated aliphatic hydrocarbon group of the organometallic compound include alkenyl groups (e.g., vinyl (ethenyl), 1-propenyl, 2-propenyl, 2-butenyl, 1-butenyl, 1-hexenyl, 2-dodecenyl, and pentenyl groups) and alkynyl groups (e.g., ethynyl, 1-propynyl, 2-propynyl, 1-butynyl, 3-hexynyl, and 2-dodecenyl groups).

The aliphatic hydrocarbon group of the organometallic compound may be a substituted aliphatic hydrocarbon group. Examples of substituents for the aliphatic hydrocarbon group include halogen atoms and epoxy, glycidyl, glycidoxy, mercapto, methacryloyl, and acryloyl groups.

Examples of the aromatic hydrocarbon group of the organometallic compound include phenylene, biphenylene, terphenylene, naphthalene, and anthracene groups.

The aromatic hydrocarbon group of the organometallic compound may be a substituted aromatic hydrocarbon group. Examples of substituents for the aromatic hydrocarbon group include halogen atoms and epoxy, glycidyl, glycidoxy, mercapto, methacryloyl, and acryloyl groups.

The organometallic compound contained in the coating layer is derived from an organometallic compound used in a surface treatment step described below, for example.

The coating layer of the silica-titania composite is determined by the following method.

An XPS qualitative analysis (wide scan analysis) is performed while etching the surface of the silica-titania composite in the depth direction using noble gas ions, thereby identifying and quantifying at least titanium, silicon, and carbon. Using the data obtained, elemental profiles of at least titanium, silicon, and carbon are each drawn with peak intensity plotted on the vertical axis and etching time on the horizontal axis. Each profile curve is divided into multiple regions at inflection points to determine a region that reflects the elementary composition of the composite body and a region that reflects the elementary composition of the coating layer. When a region that reflects the elementary composition of a surface layer exists in the elemental profiles, the silica-titania composite is determined to have the coating layer.

For example, the elemental profile of the silica-titania composite includes an elemental profile of titanium, an elemental profile of silicon, and an elemental profile of carbon.

These elemental profiles are each divided into, for example, region A, region B, and region C at inflection points of each profile curve.

Region A: a region at the final stage of etching, where the peak intensity of titanium and the peak intensity of silicon are substantially constant.

Region B: a region immediately before region A, where the peak intensity of titanium decreases and the peak intensity of silicon increases toward the composite surface side.

Region C: a region at the early stage of etching, where the peak intensity of carbon is substantially constant and a metal element is also detected.

Region A and region B are regions that reflect the elementary composition of the composite. When the composite is produced, silica and titania form covalent bonds according to the mixing ratio of an alkoxysilane to a titanium alkoxide, which are materials for the silica-titania composite, thereby forming the composite. However, silica is more likely to appear on the surface of the composite than titania. Consequently, in the elemental profiles, region A where the peak intensity of titanium and the peak intensity of silicon are substantially constant appears at the final stage of etching, and region B where the peak intensity of titanium decreases and the peak intensity of silicon increases toward the composite surface side appears immediately before region A.

Region C is a region that reflects the elementary composition of the surface layer. When region C, i.e., a region where the peak intensity of carbon is substantially constant and a metal element is also detected exists at the early stage of etching, the silica-titania composite is determined to have the above-described coating layer.

Examples of the metal atom contained in the coating layer include silicon, aluminum, and titanium. Accordingly, aluminum is also identified and quantified by XPS and an elemental profile of aluminum is also drawn, as required.

Region C, while being a region that reflects the elementary composition of the coating layer, does not necessarily completely correspond to the coating layer. The elementary composition of the composite body may be reflected on the region-B side of region C.

The thickness of the coating layer is preferably 0.1 nm or more and 30 nm or less, more preferably 0.2 nm or more and 10 nm or less, still more preferably 0.3 nm or more and 5 nm or less. The thickness of the coating layer is a value converted from an etching time of region C determined in the profile curves described above.

Method for Producing Silica-Titania Composite

The silica-titania composite according to the exemplary embodiment may be produced by any method. For example, the silica-titania composite is obtained by preparing a porous body including a silica-titania composite material by using a sol-gel process and surface-treating (hydrophobizing) the porous body with a hydrophobizing agent.

An exemplary method for producing the silica-titania composite according to the exemplary embodiment will now be described.

A method for producing the silica-titania composite according to the exemplary embodiment includes at least (1), (2), and (3) below.

(1) A step of forming a porous body including a silica-titania composite material by a sol-gel process and preparing a solution containing the porous body and a solvent (solution preparation step).

(2) A step of removing the solvent from the solution by using supercritical carbon dioxide (solvent removal step).

(3) A step of surface-treating the porous body, as obtained by removing the solvent, with a metal compound containing a metal atom and a hydrocarbon group (surface treatment step). Preferably, a step of surface-treating the porous body, as obtained by removing the solvent, with a metal compound containing a metal atom and a hydrocarbon group in supercritical carbon dioxide.

(1) Solution Preparation Step

The solution preparation step is, for example, a step of forming a porous body including a silica-titania composite material in a solvent by causing a reaction (hydrolysis and condensation) between an alkoxysilane and a titanium alkoxide which are used as materials. The porous body may be an aggregate in which primary particles including the silica-titania composite material are aggregated while forming a porous structure.

Specifically, the solution preparation step is, for example, the following step.

After an alkoxysilane and a titanium alkoxide are added dropwise to an alcohol-containing solvent with stirring, at least one of an acidic catalyst and an alkaline catalyst is added to the solvent so as to cause a reaction between the alkoxysilane and the titanium alkoxide to form a silica-titania composite, thereby preparing a solution containing the solvent and a porous body including the silica-titania composite.

By controlling the mixing ratio of the alkoxysilane to the titanium alkoxide, the elemental ratio of titanium to silicon (Ti/Si) in the porous body (i.e., the composite) and the particle diameter of the primary particles constituting the porous body can be controlled.

The particle diameter of the primary particles constituting the composite can be controlled by controlling the total amount of alkoxysilane and titanium alkoxide relative to the amount of alcohol. As the total amount relative to the amount of alcohol increases, the particle diameter of the primary particles constituting the porous body decreases. The total amount of alkoxysilane and titanium alkoxide is preferably 4 parts by mass or more and 250 parts by mass or less, more preferably 10 parts by mass or more and 50 parts by mass or less, relative to 100 parts by mass of alcohol.

Examples of alkoxysilanes include tetraalkoxysilanes, such as tetramethoxysilane, tetraethoxysilane, tetrapropoxysilane, and tetrabutoxysilane; alkyltrialkoxysilanes, such as methyltrimethoxysilane, methyltriethoxysilane, and ethyltriethoxysilane; and alkyldialkoxysilanes, such as dimethyldimethoxysilane and dimethyldiethoxysilane. These may be used alone or in combination.

Examples of titanium alkoxides include tetraalkoxytitaniums, such as tetramethoxytitanium, tetraethoxytitanium, tetrapropoxytitanium, and tetrabutoxytitanium; and alkoxytitanium chelates in which some alkoxy groups are chelated, such as di-i-propoxy.bis(ethylacetoacetate) titanium and di-i-propoxy.bis(acetylacetonate) titanium. These may be used alone or in combination.

The alcohol-containing solvent may be a solvent composed of an alcohol alone or, optionally, a mixture of an alcohol solvent and other solvents such as water, ketones, esters, halogenated hydrocarbons, and ethers. In the case of a mixed solvent, the amount of other solvent relative to the amount of alcohol may be 80 mass % or more (desirably 90 mass % or more).

Examples of alcohols include lower alcohols such as methanol and ethanol.

The catalyst used in the solution preparation step may be an acidic catalyst alone, an alkaline catalyst alone, or a combination of an acidic catalyst and an alkaline catalyst.

The acidic catalyst may be a catalyst for promoting the reaction (hydrolysis reaction, condensation reaction) of a tetraalkoxysilane. Examples of such a catalyst include oxalic acid, acetic acid, hydrochloric acid, and nitric acid, among which oxalic acid is particularly preferred. The acid concentration of an acidic catalyst solution is preferably 0.001 mass % or more and 1 mass % or less, more preferably 0.005 mass % or more and 0.1 mass % or less.

The alkaline catalyst may be a catalyst for promoting the reaction (hydrolysis reaction, condensation reaction) of a tetraalkoxysilane. Examples of such a catalyst include basic catalysts such as ammonia, urea, monoamines, and quaternary ammonium salts, among which ammonia is particularly preferred. The alkali concentration of an alkaline catalyst solution is preferably 1 mass % or more and 40 mass % or less, more preferably 10 mass % or more and 30 mass % or less.

The amount of catalyst solution (e.g., aqueous solution) added dropwise may be 0.001 parts by mass or more and 10 parts by mass or less, provided that the total amount of alkoxysilane and titanium alkoxide is 100 parts by mass.

The resulting solution may have a solids concentration of 1 mass % or more and 30 mass % or less.

(2) Solvent Removal Step

The solvent removal step is a step of removing the solvent by bringing supercritical carbon dioxide into contact with the solution (hereinafter also referred to as the "porous body solution") containing the porous body and the solvent. Solvent removal using supercritical carbon dioxide, as compared to solvent removal by heating, is less likely to cause collapse and clogging of pores of the porous body (particularly, an aggregate in which primary particles are aggregated while forming a porous structure). By performing the solvent removal step in such a manner that the solvent is removed by using supercritical carbon dioxide, a silica-titania composite having a "BET specific surface area, as determined by BET analysis of a water vapor adsorption isotherm" of 250 m$^2$/g or more can be obtained.

Specifically, the solvent removal step is performed according to the following procedure, for example.

The porous body solution is put into a sealed reactor, and then liquefied carbon dioxide is introduced thereinto. Thereafter, the sealed reactor is heated while increasing the pressure inside the sealed reactor by using a high-pressure pump, thereby bringing the carbon dioxide in the sealed reactor into a supercritical state. Liquefied carbon dioxide is then flowed into the sealed reactor to make the supercritical carbon dioxide flow out of the sealed reactor. In this manner, the supercritical carbon dioxide is flowed through the porous body solution in the sealed reactor. While the supercritical carbon dioxide flows through the porous body solution, the solvent dissolves in the supercritical carbon dioxide, and the solvent is removed together with the supercritical carbon dioxide flowing out of the sealed reactor.

The temperature and pressure in the sealed reactor are set to a temperature and pressure that brings carbon dioxide into a supercritical state. Since the critical point of carbon dioxide is 31.1° C./7.38 MPa, the temperature is set to 50° C. or higher and 200° C. or lower, and the pressure is set to 10 MPa or more and 30 MPa or less, for example.

To obtain a silica-titania composite having a contact angle with water of 100° or greater while satisfying at least one of the $H_2O$ adsorption properties (1) and the $NH_3$ adsorption properties (2), the solvent removal step may be stopped when a small amount of solvent still exists rather than be performed until the solvent in the porous body solution is completely removed. If the surface treatment step is performed in the supercritical carbon dioxide successively after the solvent removal step, the surface treatment step may be started when a small amount of solvent still exists.

If the solvent removal step is stopped when a small amount of solvent still exists, collapse and clogging of pores of the porous body (particularly, an aggregate in which primary particles are aggregated while forming a porous structure) will be even less likely to occur.

Furthermore, in the subsequent surface treatment step, a hydrophobizing agent will be likely to selectively react with "Si—OH" on the surface of the porous body. Thus, a silica-titania composite having high water-repellency due to the hydrophobizing agent while also having a high adsorption capacity due to the coexistence of "TiOH" and "SiOH" on the surface will probably be obtained.

The amount of solvent remaining in the porous body solution when the solvent removal step is stopped may be, for example, 5 mass % or more and 40 mass % or less relative to the mass of the porous body. The amount of solvent remaining in the porous body solution can be controlled by the amount of flow of supercritical carbon dioxide.

(3) Surface Treatment Step

The surface treatment step is a step of reacting a metal compound (also referred to as an "organometallic compound") containing a metal atom and a hydrocarbon group with the surface of the porous body. In the surface treatment step, a reactive group (e.g., a hydrolyzable group such as a halogeno group or an alkoxy group) in the organometallic compound reacts with a reactive group (e.g., a hydroxyl group) on the surface of the porous body, whereby the porous body is surface-treated. The surface treatment step may be performed in an ambient atmosphere, a nitrogen atmosphere, or supercritical carbon dioxide. When the surface treatment step is performed in supercritical carbon dioxide, the organometallic compound reaches deep inside pores of the porous body, and sites deep inside the pores of the porous body are surface-treated. Thus, the surface treatment step may be performed in supercritical carbon dioxide.

The surface treatment step is performed, for example, by mixing the organometallic compound with the porous body with stirring in supercritical carbon dioxide to cause a reaction. Alternatively, the surface treatment step is performed, for example, by mixing the organometallic compound with a solvent to prepare a treatment liquid and mixing the porous body with the treatment liquid with stirring in supercritical carbon dioxide. To retain the pore structure of the porous body to provide a large specific surface area, the organometallic compound may be put into supercritical carbon dioxide immediately after the step (2) to cause a reaction between the organometallic compound and the surface of the porous body in the supercritical carbon dioxide.

The temperature and pressure in the surface treatment step are set to a temperature and pressure that brings carbon dioxide into a supercritical state. For example, the surface treatment step is performed in an atmosphere at a temperature of 50° C. or higher and 200° C. or lower and a pressure of 10 MPa or more and 30 MPa or less. The stirring is continued preferably for 10 minutes or more and 24 hours or less, more preferably for 20 minutes or more and 120 minutes or less, still more preferably for 30 minutes or more and 90 minutes or less.

The organometallic compound for use in the surface treatment may be an organometallic compound containing a metal atom and a hydrocarbon group directly bonded to the metal atom. When the organometallic compound has a plurality of hydrocarbon groups, at least one hydrocarbon group may directly be bonded to the metal atom in the organometallic compound.

The metal atom of the organometallic compound is preferably silicon, aluminum, or titanium, more preferably silicon or aluminum, particularly preferably silicon.

Examples of the hydrocarbon group of the organometallic compound include saturated and unsaturated aliphatic hydrocarbon groups having 3 to 40 carbon atoms (preferably 3 to 20 carbon atoms, more preferably 3 to 18 carbon atoms, still more preferably 4 to 12 carbon atoms, even more preferably 4 to 10 carbon atoms) and aromatic hydrocarbon groups having 6 to 27 carbon atoms (preferably 6 to 20 carbon atoms, more preferably 6 to 18 carbon atoms, still more preferably 6 to 12 carbon atoms, even more preferably 6 to 10 carbon atoms).

To provide high water-repellency, the hydrocarbon group of the organometallic compound is preferably an aliphatic hydrocarbon group, more preferably a saturated aliphatic hydrocarbon group, particularly preferably an alkyl group. The aliphatic hydrocarbon group may be linear, branched, or cyclic, and is preferably linear or branched from the viewpoint of dispersibility. The number of carbon atoms in the aliphatic hydrocarbon group is preferably 3 to 20, more preferably 3 to 18, still more preferably 4 to 12, even more preferably 4 to 10.

The organometallic compound is particularly preferably a silane compound having a hydrocarbon group. Examples of such a silane compound having a hydrocarbon group include chlorosilane compounds, alkoxysilane compounds, and silazane compounds (e.g., hexamethyldisilazane).

To provide high water-repellency, the silane compound having a hydrocarbon group for use in the surface treatment may be a compound represented by formula (1): $R^1{}_n SiR^2{}_m$.

In formula (1): $R^1{}_n SiR^2{}_m$, $R^1$ represents a saturated or unsaturated aliphatic hydrocarbon group having 1 to 20 carbon atoms or an aromatic hydrocarbon group having 6 to 20 carbon atoms, $R^2$ represents a halogen atom or an alkoxy group, n represents an integer of 1 to 3, and m represents an integer of 1 to 3, provided that n+m=4. When n is an integer of 2 or 3, the plural $R^1$s may be the same group or different groups. When m is an integer of 2 or 3, the plural $R^2$s may be the same group or different groups.

The aliphatic hydrocarbon group represented by $R^1$ may be linear, branched, or cyclic. To provide high water-repellency, it is preferably linear or branched. To provide high water-repellency, the number of carbon atoms in the aliphatic hydrocarbon group is preferably 3 to 20, more preferably 3 to 18, still more preferably 4 to 12, even more preferably 4 to 10. The aliphatic hydrocarbon group may be saturated or unsaturated. To provide high water-repellency, a saturated aliphatic hydrocarbon group is preferred, and an alkyl group is more preferred.

Examples of saturated aliphatic hydrocarbon groups include linear alkyl groups (e.g., methyl, ethyl, propyl, butyl, pentyl, hexyl, heptyl, octyl, nonyl, decyl, dodecyl, hexadecyl, and icosyl groups), branched alkyl groups (e.g., isopropyl, isobutyl, isopentyl, neopentyl, 2-ethylhexyl, tertiary butyl, tertiary pentyl, and isopentadecyl groups), and cyclic alkyl groups (e.g., cyclopropyl, cyclopentyl, cyclohexyl, cycloheptyl, cyclooctyl, tricyclodecyl, norbornyl, and adamantyl groups).

Examples of unsaturated aliphatic hydrocarbon groups include alkenyl groups (e.g., vinyl (ethenyl), 1-propenyl, 2-propenyl, 2-butenyl, 1-butenyl, 1-hexenyl, 2-dodecenyl, and pentenyl groups) and alkynyl groups (e.g., ethynyl, 1-propynyl, 2-propynyl, 1-butynyl, 3-hexynyl, and 2-dodecynyl groups).

The aliphatic hydrocarbon group may be a substituted aliphatic hydrocarbon group. Examples of substituents for the aliphatic hydrocarbon group include halogen atoms and epoxy, glycidyl, glycidoxy, mercapto, methacryloyl, and acryloyl groups.

The aromatic hydrocarbon group represented by $R^1$ has preferably 6 to 20 carbon atoms, more preferably 6 to 18 carbon atoms, still more preferably 6 to 12 carbon atoms, even more preferably 6 to 10 carbon atoms.

Examples of aromatic hydrocarbon groups include phenylene, biphenylene, terphenylene, naphthalene, and anthracene groups.

The aromatic hydrocarbon group may be a substituted aromatic hydrocarbon group. Examples of substituents for the aromatic hydrocarbon group include halogen atoms and epoxy, glycidyl, glycidoxy, mercapto, methacryloyl, and acryloyl groups.

Examples of the halogen atom represented by $R^2$ include fluorine, chlorine, bromine, and iodine. The halogen atom is preferably chlorine, bromine, or iodine.

Examples of the alkoxy group represented by $R^2$ include alkoxy groups having 1 to 10 (preferably 1 to 8, more preferably 3 to 8) carbon atoms. Examples of the alkoxy group include methoxy, ethoxy, isopropoxy, t-butoxy, n-butoxy, n-hexyloxy, 2-ethylhexyloxy, and 3,5,5-trimethylhexyloxy groups. The alkoxy group may be a substituted alkoxy group. Examples of substituents for the alkoxy group include halogen atoms and hydroxyl, amino, alkoxy, amide, and carbonyl groups.

To provide high water-repellency, the compound represented by formula (1): $R^1{}_n SiR^2{}_m$ may be a compound with $R^1$ being a saturated aliphatic hydrocarbon group. In particular, the compound represented by formula (1): $R^1{}_n SiR^2{}_m$ may be a compound with $R^1$ being a saturated aliphatic hydrocarbon group having 1 to 20 carbon atoms, $R^2$ being a halogen atom or an alkoxy group, n being an integer of 1 to 3, and m being an integer of 1 to 3, provided that n+m=4.

Examples of the compound represented by formula (1): $R^1{}_n SiR^2{}_m$ include silane compounds, such as:

vinyltrimethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane (n=1, m=3);

dimethyldimethoxysilane, dimethyldiethoxysilane, methylvinyldimethoxysilane, methylvinyldiethoxysilane, diphenyldimethoxysilane, diphenyldiethoxysilane, dimethyldichlorosilane, and dichlorodiphenylsilane (n=2, m=2);

trimethylmethoxysilane, trimethylethoxysilane, trimethylchlorosilane, decyldimethylchlorosilane, and triphenylchlorosilane (n=3, m=1); and 3-glycidoxypropyltrimethoxysilane, γ-methacryloxypropyltrimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl) aminopropyltrimethoxysilane, γ-(2-aminoethyl) aminopropylmethyldimethoxysilane, and γ-glycidyloxypropylmethyldimethoxysilane (which are compounds with $R^1$ being a substituted aliphatic hydrocarbon group or a substituted aromatic hydrocarbon group).

These silane compounds may be used alone or in combination.

To provide high water-repellency, the hydrocarbon group in the silane compound represented by formula (1) is preferably an aliphatic hydrocarbon group, more preferably a saturated aliphatic hydrocarbon group, particularly preferably an alkyl group. To provide higher water-repellency, the hydrocarbon group in the silane compound is preferably a saturated aliphatic hydrocarbon group having 3 to 20 carbon atoms, more preferably a saturated aliphatic hydrocarbon group having 3 to 18 carbon atoms, still more preferably a saturated aliphatic hydrocarbon group having 4 to 12 carbon atoms, particularly preferably a saturated aliphatic hydrocarbon group having 4 to 10 carbon atoms.

Examples of the organometallic compound with the metal atom being aluminum include aluminum chelates, such as di-i-propoxy aluminum.ethyl acetoacetate; and aluminate coupling agents, such as acetoalkoxyaluminum diisopropylate.

Examples of the organometallic compound with the metal atom being titanium include titanate coupling agents, such as isopropyl triisostearoyl titanate, tetraoctyl bis(ditridecylphosphite) titanate, and bis(dioctylpyrophosphate)oxyacetate titanate; and titanium chelates, such as di-i-propoxy bis(ethylacetoacetate) titanium, di-i-propoxy bis(acetylacetonate) titanium, di-i-propoxy bis(triethanolaminate) titanium, di-i-propoxy titanium diacetate, and di-i-propoxy titanium dipropionate.

These organometallic compounds may be used alone or in combination.

When a treatment liquid prepared by mixing an organometallic compound with a solvent is used, the solvent used to prepare the treatment liquid may be any chemical substance that is compatible with the organometallic compound. The solvent used to prepare the treatment liquid may be an alcohol such as methanol, ethanol, propanol, or butanol or an organic solvent such as toluene, ethyl acetate, or acetone.

The amount of organometallic compound in the treatment liquid is preferably 10 parts by mass or more and 200 parts by mass or less, more preferably 20 parts by mass or more and 180 parts by mass or less, still more preferably 50 parts by mass or more and 150 parts by mass or less, relative to 100 parts by mass of the solvent.

The amount of organometallic compound for use in the surface treatment is preferably 10 parts by mass or more and 200 parts by mass or less, more preferably 20 parts by mass or more and 180 parts by mass or less, still more preferably 30 parts by mass or more and 150 parts by mass or less, relative to 100 parts by mass of the porous body. Not less than 10 parts by mass of the organometallic compound allows high water-repellency to be readily provided. Not more than 200 parts by mass of the organometallic compound inhibits an excess of carbon derived from the organometallic compound from being present on the surface of the porous body, thus suppressing a decrease in adsorptivity that might otherwise be caused by an excess of carbon.

After the surface treatment, a drying treatment may be performed in order to remove residues, such as an excess of the organometallic compound and the solvent of the treatment liquid. The drying treatment may be performed using a known method such as spray drying or tray drying, but the drying treatment is preferably performed by the step of removing the solvent from a dispersion including the porous body by using supercritical carbon dioxide, more preferably by the step of removing the solvent by flowing supercritical carbon dioxide in supercritical carbon dioxide immediately after the surface treatment step (3). Specifically, these steps may be performed using the same procedure as described for the step (2).

Through the above process, the silica-titania composite according to the exemplary embodiment is obtained.

The silica-titania composite according to the exemplary embodiment may be used in the form of a layer. Alternatively, the silica-titania composite may be used in the form of particles.

The silica-titania composite according to the exemplary embodiment may be used, for example, for an adsorbent, a humidity controller, or a deodorant.

Structure

A structure according to an exemplary embodiment includes the silica-titania composite according to the above exemplary embodiment.

The structure according to the exemplary embodiment may be, for example, a structure including a substrate and the silica-titania composite according to the exemplary embodiment in the form of a layer or particles on at least a part of a surface of the substrate.

The substrate may be made of any material, such as an inorganic material or an organic material, and may be of any shape. Examples of suitable substrates include metal, ceramic, glass, plastic, rubber, stone, cement, concrete, fiber, fabric, wood, paper, combinations thereof, and articles including laminates thereof. Examples of suitable substrates viewed from the standpoint of applications include construction materials, exterior materials, window frames, wallpapers, clothing and accessories, curtains, and carpets.

EXAMPLES

The exemplary embodiments of the disclosure will now be described in detail with reference to examples, but these examples are not intended to limit the exemplary embodiments of the disclosure. In the following description, all "parts" are by mass unless otherwise specified.

Example 1

Solution Preparation Step 192.24 parts of methanol, 31.5 parts of tetramethoxysilane (TMOS), and 3.2 parts of tetrabutoxytitanium (TBOT) are put into a glass reaction vessel equipped with a stirrer and a thermometer. After the mixed solution is adjusted to 25° C., 20.1 parts of water is added with stirring. While continuing the stirring, 0.5 parts of 25% aqueous ammonia is added, and the mixed solution is kept under stirring for 10 minutes. The stirring is then stopped, and the mixed solution is left to stand to obtain a porous gel containing a silica-titania composite material.

Thereafter, 200 parts of methanol is added to the porous gel, and the porous gel is crushed by stirring to obtain a porous body solution 1.

Solvent Removal Step and Surface Treatment Step

In the following manner, solvent removal from the porous body solution 1 and surface treatment (hydrophobization) of the porous body are performed. In the solvent removal and the surface treatment, a carbon dioxide cylinder, a carbon dioxide pump, an autoclave equipped with a stirrer, and an apparatus equipped with a back-pressure valve are used. A trapping device for trapping removed solvent and a gas flow meter (DC-5 manufactured by Shinagawa Co., Ltd.) for measuring the flow rate of carbon dioxide are placed behind the back-pressure valve.

First, the autoclave equipped with a stirrer and the apparatus equipped with a back-pressure valve are provided, and 400 parts of the porous body solution 1 is put into the autoclave. The autoclave is then filled with liquefied carbon dioxide.

Next, the stirrer is operated at 200 rpm, and the temperature is raised to 150° C. using a heater, after which the pressure is increased to 20 MPa using the carbon dioxide pump. In this manner, supercritical carbon dioxide is flowed into the autoclave to remove the solvent of the porous body solution 1. The trapping device, which is maintained at 0° C. with a cooling medium, is able to separate the removed solvent from carbon dioxide. Carbon dioxide then passes through the gas flow meter, whereby the flow rate is measured.

Next, the flow of supercritical carbon dioxide is stopped when the amount of flow of supercritical carbon dioxide (total amount: measured in terms of the amount of flow of carbon dioxide at standard temperature and pressure) reaches 3,110 L. The amount of solvent remaining in the porous body solution 1 at this point is 15 mass %.

After the flow of supercritical carbon dioxide is stopped, 34.7 parts of isobutyltrimethoxysilane (IBTMS), serving as a hydrophobizing agent, is added.

Thereafter, while maintaining the treatment temperature at 150° C. using the heater, maintaining the pressure at 20 MPa using the carbon dioxide pump, and maintaining the supercritical state of carbon dioxide in the autoclave, the stirrer is operated at 200 rpm for 30 minutes for surface treatment. After the 30-minute surface treatment, supercritical carbon dioxide is flowed again. The pressure is released to atmospheric pressure using the back-pressure valve, and the temperature is decreased to room temperature. Thereafter, the stirrer is stopped, and a hydrophobized massive porous body (i.e., a massive silica-titania composite) is taken out of the autoclave.

Through the above process, a silica-titania composite is obtained.

Examples 2 to 13 and Comparative Examples 1 to 8

Massive silica-titania composites are obtained in the same manner as in Example 1 except that the production conditions are varied as shown in Tables 1 and 2.

Measurement of Physical Properties of Silica-Titania Composite

The silica-titania composite obtained in each Example is measured for the following physical properties by methods described.

"Elemental ratio Ti/Si" of composite

Average diameter of primary particles (average primary particle diameter) of composite (designated as "primary particle diameter" in Table 2)

BET specific surface area determined by BET analysis of nitrogen adsorption isotherm (designated as "$N_2$ BET specific surface area" in Table 2)

BET specific surface area determined by BET analysis of water vapor adsorption isotherm (designated as "$H_2O$ BET specific surface area" in Table 2)

$H_2O$ adsorption properties (adsorbed amount at each relative pressure $P/P_0$; $P_c/P_0$ in Table 1 indicates the relative pressure at which a hysteresis loop is closed.)

$NH_3$ adsorption properties (adsorbed amount at each ammonia pressure (10 kPa, 90 kPa); $P_c$ in Table 2 indicates the ammonia pressure at which a hysteresis loop is closed.)

"Contact angle with water" of composite

Performance Evaluation of Silica-Titania Composite Stain Resistance

The stain resistance is evaluated as follows.

Three microliters of a contaminant is dropped onto a surface of a sample of the silica-titania composite obtained in each Example. After one hour, a wipe test is performed using KIMWIPES S-200 (manufactured by NIPPON PAPER CRECIA CO., LTD). The contaminant used is coffee.

The evaluation criteria are as follows.

A: Droplets roll down the surface to leave no stain.

B: No traces of stain are left after wiping.

C: Stain is not removed by wiping, but traces of stain are erased by dropping 20 droplets of 3-microliter water from above and wiping them off.

D: Stain is not removed by wiping, but traces of stain are erased by dropping 100 droplets of 3-microliter water from above and wiping them off.

E: Stain is not removed by wiping, and traces of stain remain after 100 droplets of 3-microliter water is dropped from above and wiped off.

Adsorptivity

The adsorptivity is evaluated as follows.

1 g of a sample of the silica-titania composite obtained in each Example is put in a 1 L TEDLAR bag having one cock, and all the remaining air is removed by using an aspirator. 800 ml of an unpleasant household odor gas is injected into the bag, and the concentration of the gas is measured using a detector tube after a predetermined time period. The unpleasant household odor gas used is an ammonia gas with an initial concentration of 300 ppm, and the concentration after 120 minutes is measured.

The evaluation criteria are as follows.

A: Less than 5 ppm, adsorptivity is very good.

B: 5 ppm or more and less than 25 ppm, adsorptivity is good.

C: 25 ppm or more and less than 50 ppm, adsorptivity is slightly good.

D: 50 ppm or more and less than 150 ppm, adsorptivity is poor.

E: 150 ppm or more, adsorptivity is very poor.

Details of Examples and Comparative Examples are shown in Tables 1 and 2 below.

Abbreviations in Tables are as follows.

Aqueous ammonia: aqueous $NH_3$

TMOS: tetramethoxysilane

TBOT: tetrabutoxytitanium

TABLE 1

| | Solution preparation step | | | | | | Solvent removal step | |
|---|---|---|---|---|---|---|---|---|
| | Methanol | Water | Alkoxysilane | | Titanium alkoxide | | Amount of flow of supercritical $CO_2$ (L) | Amount of remaining solvent (mass %) |
| | Amount (parts) | Amount (parts) | Type | Amount (parts) | Type | Amount (parts) | | |
| Example 1 | 192.24 | 20.1 | TMOS | 31.5 | TBOT | 3.2 | 3110 | 15 |
| Example 2 | 192.24 | 20.1 | TMOS | 17.4 | TBOT | 25.3 | 3110 | 12 |
| Example 3 | 192.24 | 20.1 | TMOS | 32.5 | TBOT | 1.17 | 3110 | 15 |
| Example 4 | 192.24 | 20.1 | TMOS | 31.5 | TBOT | 3.2 | 3110 | 15 |
| Example 6 | 192.24 | 20.1 | TMOS | 31.5 | TBOT | 3.2 | 3110 | 15 |
| Example 7 | 192.24 | 20.1 | TMOS | 31.5 | TBOT | 3.2 | 3110 | 15 |
| Example 8 | 192.24 | 20.1 | TMOS | 31.5 | TBOT | 3.2 | 1555 | 35 |
| Example 9 | 192.24 | 20.1 | TMOS | 31.5 | TBOT | 3.2 | 6220 | 8 |
| Example 10 | 192.24 | 20.1 | TMOS | 31.5 | TBOT | 3.2 | 3110 | 15 |
| Example 11 | 192.24 | 20.1 | TMOS | 31.5 | TBOT | 3.2 | 3110 | 15 |
| Example 12 | 192.24 | 20.1 | TMOS | 31.5 | TBOT | 3.2 | 3110 | 15 |
| Example 13 | 192.24 | 20.1 | TMOS | 31.5 | TBOT | 3.2 | 3110 | 15 |
| Comparative Example 1 | 192.24 | 20.1 | TMOS | 13.9 | TBOT | 20.9 | 3110 | 15 |

TABLE 1-continued

| | | | | | | | |
|---|---|---|---|---|---|---|---|
| Comparative Example 2 | 192.24 | 20.1 | TMOS | 33.8 | TBOT | 1.0 | 3110 | 15 |
| Comparative Example 3 | 192.24 | 20.1 | TMOS | 31.5 | TBOT | 3.2 | 3110 | 15 |
| Comparative Example 5 | 192.24 | 20.1 | TMOS | 31.5 | TBOT | 3.2 | 3110 | 15 |
| Comparative Example 7 | 192.24 | 20.1 | TMOS | 31.5 | TBOT | 3.2 | 987 | 45 |
| Comparative Example 8 | 192.24 | 20.1 | TMOS | 31.5 | TBOT | 3.2 | 7392 | 2 |

| | Surface treatment step | | |
|---|---|---|---|
| | Treatment | Hydrophobizing agent | |
| | temperature (° C.) | Type | Amount (parts) |
| Example 1 | 150 | isobutyltrimethoxysilane | 34.7 |
| Example 2 | 150 | isobutyltrimethoxysilane | 34.7 |
| Example 3 | 150 | isobutyltrimethoxysilane | 34.7 |
| Example 4 | 150 | decyltrimethoxysilane | 34.7 |
| Example 6 | 150 | isobutyltrimethoxysilane | 17.4 |
| Example 7 | 150 | isobutyltrimethoxysilane | 69.4 |
| Example 8 | 150 | isobutyltrimethoxysilane | 34.7 |
| Example 9 | 150 | isobutyltrimethoxysilane | 34.7 |
| Example 10 | 150 | hexyltrimethoxysilane | 34.7 |
| Example 11 | 150 | dodecyltrimethoxysilane | 34.7 |
| Example 12 | 150 | isopropyl triisostearoyl titanate | 34.7 |
| Example 13 | 150 | acetoalkoxyaluminum diisopropylate | 34.7 |
| Comparative Example 1 | 150 | isobutyltrimethoxysilane | 34.7 |
| Comparative Example 2 | 150 | isobutyltrimethoxysilane | 34.7 |
| Comparative Example 3 | 150 | methyltrimethoxysilane | 34.7 |
| Comparative Example 5 | 150 | isobutyltrimethoxysilane | 1.7 |
| Comparative Example 7 | 150 | isobutyltrimethoxysilane | 34.7 |
| Comparative Example 8 | 150 | isobutyltrimethoxysilane | 34.7 |

TABLE 2

| | Properties of composite | | | | | | | |
|---|---|---|---|---|---|---|---|---|
| | Elemental ratio Ti/Si (%) | Primary particle diameter (nm) | $N_2$ BET specific surface area (m$^2$/g) | $H_2O$ BET specific surface area (m$_2$/g) | $H_2O$ adsorption properties | | | |
| | | | | | $P/P_0 = 0.1$ | $P/P_0 = 0.5$ | $P/P_0 = 0.9$ | $P_c/P_0$ |
| Example 1 | 3.4 | 31 | 896 | 356 | 83 | 185 | 415 | 0.04 |
| Example 2 | 46.1 | 82 | 473 | 498 | 118 | 292 | 495 | 0.20 |
| Example 3 | 1.2 | 18 | 1101 | 265 | 69 | 159 | 367 | 0.02 |
| Example 4 | 3.3 | 35 | 879 | 350 | 80 | 182 | 411 | 0.06 |
| Example 6 | 3.5 | 30 | 938 | 375 | 91 | 191 | 421 | 0.04 |
| Example 7 | 3.3 | 36 | 827 | 326 | 71 | 169 | 403 | 0.06 |
| Example 8 | 3.3 | 38 | 593 | 401 | 109 | 258 | 461 | 0.10 |
| Example 9 | 3.5 | 37 | 578 | 391 | 103 | 259 | 461 | 0.08 |
| Example 10 | 3.4 | 35 | 781 | 275 | 70 | 161 | 381 | 0.08 |
| Example 11 | 3.3 | 32 | 765 | 268 | 66 | 160 | 370 | 0.06 |
| Example 12 | 4.0 | 35 | 815 | 341 | 80 | 175 | 405 | 0.15 |
| Example 13 | 3.8 | 36 | 821 | 335 | 81 | 177 | 401 | 0.05 |
| Comparative Example 1 | 52.1 | 208 | 156 | 105 | 32 | 89 | 109 | 0.35 |
| Comparative Example 2 | 0.8 | 8 | 1358 | 55 | 11 | 21 | 30 | 0.02 |
| Comparative Example 3 | 3.4 | 35 | 879 | 359 | 88 | 198 | 421 | 0.08 |
| Comparative Example 5 | 3.2 | 30 | 915 | 391 | 99 | 209 | 499 | 0.01 |

TABLE 2-continued

| | | | | | | | | | Properties of composite | | | | Performance of composite | |
|---|---|---|---|---|---|---|---|---|---|---|---|---|---|---|
| | | | | | | | | | NH$_3$ adsorption properties | | | Contact angle with water (°) | Stain resistance | Adsorptivity |
| | | | | | | | | | 10 kPa | 90 kPa | P$_c$ | | | |
| Comparative Example 7 | 3.4 | 35 | 437 | 295 | 80 | 190 | 340 | 0.41 | | | | | | |
| Comparative Example 8 | 3.6 | 35 | 305 | 206 | 54 | 137 | 243 | 0.45 | | | | | | |
| Example 1 | | | | | | | | | 108 | 205 | 4 | 123 | B | A |
| Example 2 | | | | | | | | | 138 | 285 | 28 | 102 | C | A |
| Example 3 | | | | | | | | | 101 | 130 | 2 | 151 | A | C |
| Example 4 | | | | | | | | | 103 | 195 | 8 | 145 | B | B |
| Example 6 | | | | | | | | | 120 | 213 | 5 | 109 | C | A |
| Example 7 | | | | | | | | | 105 | 195 | 4 | 119 | B | B |
| Example 8 | | | | | | | | | 135 | 275 | 15 | 103 | C | A |
| Example 9 | | | | | | | | | 131 | 271 | 10 | 102 | C | A |
| Example 10 | | | | | | | | | 104 | 200 | 11 | 118 | B | A |
| Example 11 | | | | | | | | | 103 | 204 | 8 | 115 | B | A |
| Example 12 | | | | | | | | | 110 | 225 | 21 | 117 | B | A |
| Example 13 | | | | | | | | | 112 | 231 | 10 | 112 | C | A |
| Comparative Example 1 | | | | | | | | | 61 | 89 | 43 | 68 | E | D |
| Comparative Example 2 | | | | | | | | | 21 | 48 | 4 | 153 | A | E |
| Comparative Example 3 | | | | | | | | | 114 | 201 | 10 | 98 | C | A |
| Comparative Example 5 | | | | | | | | | 115 | 213 | 5 | 89 | D | A |
| Comparative Example 7 | | | | | | | | | 125 | 203 | 38 | 87 | D | A |
| Comparative Example 8 | | | | | | | | | 85 | 143 | 51 | 85 | E | C |

The above results show that the silica-titania composites of Examples have higher stain resistance and higher hydrophile adsorptivity than the silica-titania composites of Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A silica-titania composite comprising:
   the silica-titania composite having a BET specific surface area, as determined by BET analysis of a water vapor adsorption isotherm, in a range of 250 m$^2$/g to 500 m$^2$/g, and
   a contact angle with water of 100° or greater, and
   in the water vapor adsorption isotherm, an adsorbed amount at relative pressure P/P$_0$=0.1 is in a range of 65 cm$^3$/g to 120 cm$^3$/g, an adsorbed amount at relative pressure P/P$_0$=0.5 is in a range of 150 cm$^3$/g to 300 cm$^3$/g, and an adsorbed amount at relative pressure P/P$_0$=0.9 is in a range of 350 cm$^3$/g to 500 cm$^3$/g.

2. The silica-titania composite according to claim 1, wherein an elemental ratio of titanium to silicon (Ti/Si) is in a range of 1% to 50%.

3. The silica-titania composite according to claim 1, wherein an elemental ratio of titanium to silicon (Ti/Si) is in a range of 3% to 20%.

4. The silica-titania composite according to claim 1, wherein the silica-titania composite is a hydrophobized composite.

5. The silica-titania composite according to claim 1, comprising a coating layer containing a metal atom having a hydrocarbon group, the metal atom being bonded to a surface of a composite body through an oxygen atom.

6. The silica-titania composite according to claim 5, wherein the hydrocarbon group is a saturated or unsaturated aliphatic hydrocarbon group having 3 to 20 carbon atoms or an aromatic hydrocarbon group having 6 to 27 carbon atoms.

7. The silica-titania composite according to claim 6, wherein the hydrocarbon group is a saturated aliphatic hydrocarbon group.

8. The silica-titania composite according to claim 7, wherein the saturated aliphatic hydrocarbon group has 4 to 10 carbon atoms.

9. The silica-titania composite according to claim 1, wherein the silica-titania composite has a BET specific surface area, as determined by BET analysis of a water vapor adsorption isotherm, in a range of 250 m$^2$/g to 500 m$^2$/g, and
   in an ammonia adsorption isotherm, an adsorbed amount at an ammonia pressure of 10 kPa is in a range of 100 cm$^3$/g to 140 cm$^3$/g, and an adsorbed amount at an ammonia pressure of 90 kPa is in a range of 120 cm$^3$/g to 300 cm$^3$/g.

10. The silica-titania composite according to claim 5, wherein the metal atom is a silicon atom.

11. A silica-titania composite comprising:
the silica-titania composite having a BET specific surface area, as determined by BET analysis of a water vapor adsorption isotherm, in a range of 250 m²/g to 500 m²/g, and
a contact angle with water of 100° or greater, and
in an ammonia adsorption isotherm, an adsorbed amount at an ammonia pressure of 10 kPa is in a range of 100 cm³/g to 140 cm³/g, and an adsorbed amount at an ammonia pressure of 90 kPa is in a range of 120 cm³/g to 300 cm³/g.

12. The silica-titania composite according to claim 11, wherein an elemental ratio of titanium to silicon (Ti/Si) is in a range of 1% to 50%.

13. The silica-titania composite according to claim 11, wherein the silica-titania composite is a hydrophobized composite.

14. The silica-titania composite according to claim 11, comprising a coating layer containing a metal atom having a hydrocarbon group, the metal atom being bonded to a surface of a composite body through an oxygen atom.

15. The silica-titania composite according to claim 14, wherein the metal atom is a silicon atom.

16. The silica-titania composite according to claim 11, wherein the silica-titania composite has a BET specific surface area, as determined by BET analysis of a water vapor adsorption isotherm, in a range of 265 m²/g to 500 m²/g, and
in the water vapor adsorption isotherm, an adsorbed amount at relative pressure $P/P_0=0.1$ is in a range of 65 cm³/g to 120 cm³/g, an adsorbed amount at relative pressure $P/P_0=0.5$ is in a range of 150 cm³/g to 300 cm³/g, and an adsorbed amount at relative pressure $P/P_0=0.9$ is in a range of 350 cm³/g to 500 cm³/g.

17. A structure comprising the silica-titania composite according to claim 1.

* * * * *